(12) United States Patent
Wu et al.

(10) Patent No.: US 11,544,977 B2
(45) Date of Patent: Jan. 3, 2023

(54) VIBRATION-BASED AUTHENTICATION METHOD FOR ACCESS CONTROL SYSTEM

(71) Applicant: SHENZHEN UNIVERSITY, Shenzhen (CN)

(72) Inventors: Kaishun Wu, Shenzhen (CN); Yandao Huang, Shenzhen (CN); Wenkai Yang, Shenzhen (CN); Lin Chen, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 91 days.

(21) Appl. No.: 17/037,754

(22) Filed: Sep. 30, 2020

(65) Prior Publication Data
US 2021/0035388 A1 Feb. 4, 2021

(51) Int. Cl.
*G07C 9/00* (2020.01)
*G06N 20/00* (2019.01)
*G06F 3/01* (2006.01)
*G06F 17/14* (2006.01)
*G06K 9/62* (2022.01)

(52) U.S. Cl.
CPC ......... *G07C 9/00182* (2013.01); *G06F 3/016* (2013.01); *G06F 17/142* (2013.01); *G06K 9/6257* (2013.01); *G06N 20/00* (2019.01); *G07C 2009/00206* (2013.01)

(58) Field of Classification Search
CPC ...... G07C 9/00182; G07C 2009/00206; G06N 20/00; G06F 3/016; G06F 17/142; G06F 21/32; G06K 9/6257; H04L 63/0861
See application file for complete search history.

(56) References Cited

U.S. PATENT DOCUMENTS

| | | | |
|---|---|---|---|
| 10,075,846 B1* | 9/2018 | Acar | H04L 63/0861 |
| 2016/0232726 A1* | 8/2016 | Zizi | G07C 9/257 |
| 2018/0158266 A1* | 6/2018 | Zizi | G07C 9/257 |
| 2019/0384898 A1* | 12/2019 | Chen | G06F 21/36 |

* cited by examiner

*Primary Examiner* — Orlando Bousono
(74) *Attorney, Agent, or Firm* — Bayramoglu, Law Offices LLC

(57) ABSTRACT

A vibration-based authentication method for an access control system includes: collecting vibration signals generated by a built-in vibration motor in an authentication device; filtering, denoising, and performing endpoint segmentation on the collected vibration signals, and extracting vibration signals containing effective touch; performing an alignment on the segmented vibration signals; performing a fast Fourier transform on the aligned vibration signals to obtain frequency-domain data, extracting frequency-domain features obtained after alignment and features obtained before alignment to construct a training data set, and storing the training data set in a database of the authentication device; using a new unlock signal generated when a user touches the authentication device as test data, and processing the test data to obtain test data containing effective touch; and matching and classifying the test data containing effective touch with the training data set by using a machine learning classification model, to obtain an authentication result.

1 Claim, 1 Drawing Sheet

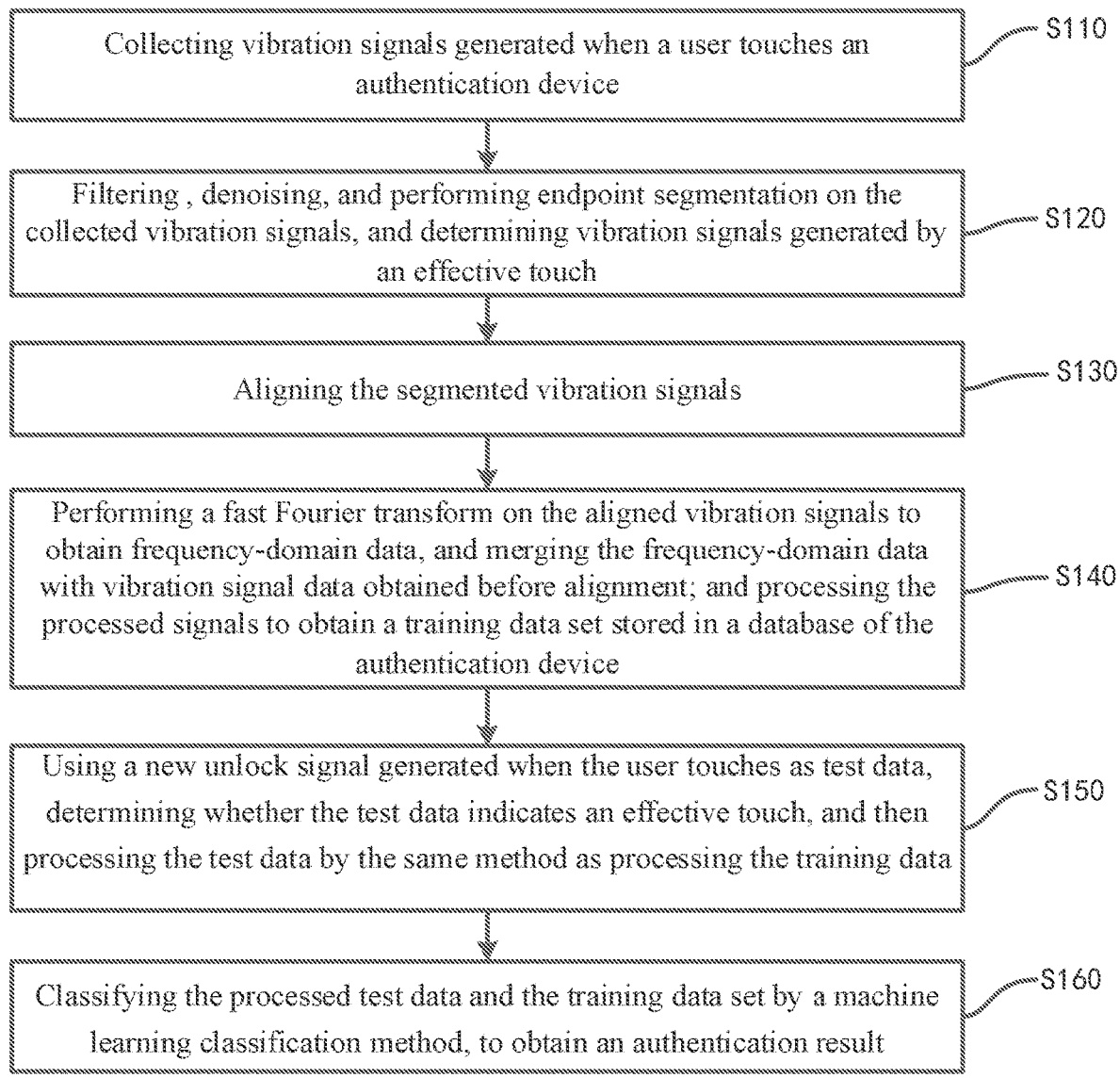

VIBRATION-BASED AUTHENTICATION METHOD FOR ACCESS CONTROL SYSTEM

CROSS REFERENCE TO THE RELATED APPLICATIONS

This application is based upon and claims priority to Chinese Patent Application No. 201910712796.6, filed on Aug. 2, 2019, the entire contents of which are incorporated herein by reference.

TECHNICAL FIELD

The present invention relates to the technical field of information processing, and in particular to a vibration-based authentication method for an access control system.

BACKGROUND

With the development of science and technology, intelligent access control is widely used, for example, to allow authorized personnel or vehicles to enter or exit communities and parking lots, to improve security and management convenience. Integrated circuit (IC) cards are typically used as access control cards in current intelligent access control. However, IC cards have poor security performance and can be easily copied. If an IC card is lost or transferred to an unauthorized person, it may be used to make many unauthorized copies, which seriously undermines the security of the communities that uses the IC card for access control.

Traditional access control systems are typically achieved through, for example, smart card identification, password identification, key unlocking, application (APP) intelligent control, and fingerprint identification. Physical keys in some cases can be inconvenient, for example, it could be misplaced or left at home. Password identification also comes with burdens to users, such as it requires users to remember a long string of codes and users need to enter them repeatedly. APP intelligent control and fingerprint identification are sometimes limited due to high costs and other reasons.

Thus, a method that improves the existing door-opening authentication solutions with higher security and lower costs is needed.

SUMMARY

An objective of the present invention is to provide a vibration-based authentication method for an access control system to overcome the above-mentioned shortcomings in the prior art.

According to the first aspect of the present invention, a vibration-based authentication method for an access control system is provided. Vibration signals generated by the touch of a user are converted into digital signals and stored in the authentication device through a vibration motor and an accelerometer built in an authentication device, and classification judgments are performed by using a machine learning algorithm during authentication. Compared with the prior art, the hardware that is required for the present invention cost less because of the simple the design of the device and system, convenient to use, and has high security and wide application prospects.

BRIEF DESCRIPTION OF THE DRAWINGS

The following drawings are merely schematic illustration and explanation to the present invention and are not intended to limit the scope of the present invention, wherein:

FIGURE is a flow chart of the vibration-based authentication method for an access control system according to an embodiment of the present invention.

DETAILED DESCRIPTION OF THE EMBODIMENTS

In order to make the objectives, technical solutions, design methods, and advantages of the present invention clearer, the present invention is further described in detail below with reference to the drawings and specific embodiments. It should be understood that the specific embodiments described herein are used only to interpret the present invention rather than to limit the present invention.

In all the examples shown and discussed herein, any specific value should be construed as merely exemplary rather than restrictive. Therefore, other examples of exemplary embodiments may have different values.

Technologies, methods, and devices known to those having ordinary skill in the art may not be discussed in detail but, where appropriate, the technologies, methods, and devices described should be considered as part of the specification.

According to the first aspect of the present invention, a vibration-based authentication method for an access control system is provided. The method includes the following steps:

S1, collecting, when a user touches an authentication device of the access control system, vibration signals generated by a built-in vibration motor in the authentication device;

S2, filtering, denoising and performing endpoint segmentation on the collected vibration signals, and extracting vibration signals containing an effective touch;

S3, performing an alignment on the segmented vibration signals;

S4, performing a fast Fourier transform on the aligned vibration signals to obtain frequency-domain data, extracting frequency-domain features obtained after the alignment and features obtained before the alignment to construct a training data set, and storing the training data set in a database of the authentication device;

S5, using a new unlock signal that is generated when the user touches the authentication device of the access control system as test data, and processing the test data to obtain the test data containing the effective touch; and S6, matching and classifying the test data containing the effective touch with the training data set by using a machine learning classification model, to obtain an authentication result.

In an embodiment, step S1 includes:
building an accelerometer in the authentication device, and detecting the vibration signals generated by the built-in vibration motor in the authentication device by the accelerometer when the user holds a door handle or places a palm in a sensing area of the authentication device.

In an embodiment, step S2 includes:
step S21, filtering and denoising the detected vibration signals to obtain filtered vibration signals; and
step S22, traversing the filtered vibration signals by using a fixed-length window, determining that a touch signal appears when the signal energy in the window is at maximum, and using signals before and after the window as the segmented vibration signals, wherein the signals have a fixed length.

In an embodiment, step S3 includes:

calculating an offset between two vibration signals, then moving the current vibration signals, extracting a complete part shared between the two vibration signals, and using the complete part as the vibration signals obtained after the alignment, the alignment can be expressed as:

$$C(a, b) = \sum_{i=1}^{n} a(i) \cdot b(i);$$

$$P(A, B) = \operatorname{argmax}(C(A[i, i+n-1], B)), i \in 1, 2, \ldots 2n;$$

$$O(A, B) = P(A, B) - n;$$

wherein an offset O (A,B) between two vibration signals is calculated by formula O(A,B)=P(A,B)-n; a and b represent the two vibration signals with a length of n, a(i) represents an amplitude of the $i^{th}$ point of the vibration signal a, and b(i) represents an amplitude of the $i^{th}$ point of the vibration signal b; C(a,b) represents a correlation between the vibration signal a and the vibration signal b; A represents a first signal with a length of 3n, wherein the first signal is obtained by zero-padding parts with a length of n on two sides of the vibration signal a; B represents the vibration signal b with a length of n; P (A,B) represents a position of a signal in the first signal A, wherein the signal has a length of n and has the highest correlation with the second signal B; and O(A,B) is an offset between the first signal A and the second signal B obtained by calculation.

In an embodiment, in step S4, features of the vibration signals contained in the training data set are selected by using a chi-square test and principal component analysis (PCA).

In an embodiment, the chi-square test is expressed as:

$$\chi^2 = \sum \frac{(A-E)^2}{E} = \sum_{i=1}^{k} \frac{(A_f - E_i)^2}{E_i};$$

wherein A represents an observed frequency, and E represents an expected frequency.

In an embodiment, the machine learning classification model is a nearest neighbor model.

In an embodiment, step S6 includes: comparing features of the test data with features in the training data one by one, and setting a classification label of the test data to a label of the training data with the highest similarity.

FIGURE is a flow chart of the vibration-based authentication method for an access control system according to an embodiment of the present invention, which includes the following steps.

Step S110: vibration signals generated when a user touches an authentication device are collected.

For example, when the user holds a door handle with one hand or places a palm in a sensing area, the vibration motor that is built in the authentication device of the access control system will automatically vibrate, and the vibration signals are collected by an accelerometer.

The vibration motor and the accelerometer that are built in the authentication device may adopt commercially available or specialized products such as commercially available miniature vibration motors.

Step S120: filtering, denoising and endpoint segmentation are performed on the collected vibration signals, and vibration signals generated by an effective touch are determined.

In order to remove undesired components in the vibration signals, the vibration signals detected by the accelerometer are filtered and denoised to obtain effective data. For example, the collected vibration signals are filtered and denoised by using a Butterworth filter, low-frequency noise is filtered by using a high-pass filter with a cut-off frequency of 16 kHz, and high-frequency noise is filtered by using a low-pass filter with a cut-off frequency of 22 kHz.

Further, slicing (i.e., endpoint segmentation) is performed on the filtered vibration signals, equal-length peaks and the effective data nearby are extracted, and data without vibration signals is removed.

For example, during endpoint segmentation, vibration signals in an entire segment are traversed by using a fixed-length window. When the energy of signals in a segment is at maximum (or exceeds a threshold), it is determined that a touch signal appears, and signals before and after the segment are used as the segmented vibration signals, wherein the signals have a certain length. The vibration signals are the vibration signals containing the effective touch.

Step S130: an alignment is performed on the segmented vibration signals.

An alignment is performed on vibration signals generated by multiple touches. For example, an alignment is performed on the segmented vibration signals using a population cross-correlation method. The alignment includes: determine an offset between two vibration signals, then move the current vibration signals, and only a complete part shared between the two vibration signals after the movement is extracted.

Specifically, the alignment is performed as following:

$$C(a, b) = \sum_{i=1}^{n} a(i) \cdot b(i); \tag{1}$$

$$P(A, B) = \operatorname{argmax}(C(A[i, i+n-1], B)), i \in 1, 2, \ldots 2n; \tag{2}$$

$$O(A, B) = P(A, B) - n; \tag{3}$$

wherein the offset O(A,B) between two vibration signals is calculated by formula O(A,B)=P(A,B)-n; a and b represent two vibration signals with a length of n, a(i) represents the amplitude of the $i^{th}$ point of the vibration signal a, and b(i) represents the amplitude of the $i^{th}$ point of the vibration signal b; C(a,b) represents the correlation between the vibration signal a and the vibration signal b; A represents a first signal with a length of 3n, wherein the first signal is obtained by zero-padding parts with a length of n on two sides of the vibration signal a; B represents the vibration signal b with a length of n; P(A,B) represents a position of a signal in the first signal A, wherein the signal has a length of n and has the highest correlation with the second signal B; and O (A,B) is an offset between the first signal A and the second signal B obtained by calculation.

The authentication accuracy can be improved by performing an alignment on a plurality of vibration signals in the training data set.

Step S140: a fast Fourier transform is performed on the aligned vibration signals to obtain frequency-domain data, and the frequency-domain data is merged with the vibration signal data before alignment; and the processed signals are processed and used as a training data set stored in a database of the authentication device.

For example, the fast Fourier transform is performed on the signals as follow:

$$X(k) = \sum_{n=0}^{N-1} x(n)\cos\left(2\pi k \frac{n}{N}\right) - jx(n)\sin\left(2\pi k \frac{n}{N}\right), \quad (4)$$
$$k = 0, 1, 2 \ldots N-1;$$

wherein x(n) represents aligned vibration signals, and X(k) represents frequency-domain data obtained after the transform.

The frequency-domain data is obtained by a fast Fourier transform, and the data is merged with original data to obtain training set data. The constructed training data set includes multi-dimensional frequency-domain features obtained after alignment and multi-dimensional features obtained before alignment. For example, the frequency-domain features include, but are not limited to, power spectral density, frequency, phase, etc. The features obtained before alignment include, but are not limited to, amplitude features of the vibration signals, etc.

Further, the features are selected from the training data set by a chi-square test. The chi-square test is generally expressed as:

$$\chi^2 = \sum \frac{(A-E)^2}{E} = \sum_{i=1}^{k} \frac{(A_i - E_i)^2}{E_i} = \sum_{i=1}^{k} \frac{(A_i - np_i)^2}{np_i}; \quad (5)$$

wherein A represents an observed frequency (observed value), and E represents an expected frequency (theoretical value). A deviation between the observed value and the theoretical value can be calculated by the chi-square test. The chi-square test selects features that are closely correlated with the authentication result from the training data set based on a deviation between an actual observed value and the theoretical value.

Finally, dimension reduction is performed on high-dimensional data by PCA. The PCA is obtained by a covariance matrix. For a sample X and a sample Y, the covariance matrix is generally expressed by the following formula:

$$\text{Cov}(X, Y) = \frac{\sum_{i=1}^{n}(X_i - \overline{X})(Y_i - \overline{Y})}{n-1}. \quad (6)$$

The basic principle of the PCA dimension reduction is as follows. A covariance matrix of the training set data matrix is calculated to obtain eigenvalues and eigenvectors of the covariance matrix, and a matrix composed of the eigenvectors corresponding to k features with the maximum eigenvalue (i.e., the maximum variance) is selected. In this way, the dimension reduction of the training set data features can be achieved, thus accelerating the subsequent processing.

Step S150: a new unlock signal generated when the user touches is used as test data, it is determined whether the test data indicates an effective touch, and then the test data is processed using the same method as processing the training data.

Data of a new unlock signal generated when the user touches is used as test data. It is determined whether the test data indicates an effective touch. An effective touch signal should include a flat signal segment, followed by a signal peak, and finally a flat signal segment. If the values of several signal points before and after the signal exceed a set threshold, the signal collected is discarded.

Then, the test data is processed by the same method as processing the training data. Specifically, the method includes: filtering, denoising, and endpoint segmentation are performed on the test data, then the test data is aligned with the training data, and finally a fast Fourier transform is performed on the segmented data, etc.

Step S160: the processed test data and the training data set are classified by a machine learning classification method to obtain an authentication result.

During the process of authenticating a user, vibration signals generated by each touch are compared and classified with all original vibration signals in the database of the authentication device through a machine learning classification algorithm, so as to accomplish the authentication.

For example, the machine learning classification algorithm may employ a k-nearest neighbor (KNN) classifier or other neural network classifiers to match the test data and the training data. When performing authentication on a user, the user also only needs to hold a door handle or place a palm in a sensing area. The generated vibration signals are compared with the training data stored in the database, and a Euclidean distance between the test data and the training data is determined. A resulting distance that does not exceed the set threshold indicates as a legal touch, otherwise, the user is identified as an illegal user, so as to obtain the authentication result.

The working principle of KNN is as follows. Each sample data that is in the training data set consists of a label, which is a correspondence between each sample in the training data set and its class that is known. When new data without labels that is input, each feature of the new data is compared with the corresponding feature of the sample data in the training data set, and then a classification label of the new data will be set to a label of the training data with the highest similarity (nearest neighbor). For example, Euclidean distances between the new data and the training data are calculated; the distances are sorted in increasing order; k pieces of sample data with the minimum distance are selected; and a frequency of occurrence of a class to which the first k pieces of sample data belong, that is, a similarity between the new data and the training data, is determined.

The principle of the vibration-based authentication method in the embodiments of the present invention lies in that different human bodies generate different vibration signals, and touches of different users can be distinguished by using different vibration signals, so as to achieve authentication.

To sum up, the new intelligent vibration-based authentication method for an access control system provided by the present invention is based on users' vibration signals and machine learning by using a vibration motor and an accelerometer built in an authentication device, which is low-cost in hardware, simple in device and system, convenient to use, and is widely used.

It should be noted that although the steps are described above in a particular order, it does not mean that the steps must be executed in that particular order. In practice, some of these steps can be executed concurrently, or even in a different order, as long as the required functions can be implemented. Moreover, the threshold setting involved can be set in practical applications through statistical analysis, which is not limited in the present invention.

The present invention may be a system, a method, and/or a computer program product. The computer program product may include a computer-readable storage medium, and computer-readable program instructions are stored in the computer-readable storage medium to enable a processor to implement various aspects of the present invention.

The computer-readable storage medium may be a tangible device capable of retaining and storing instructions used by an instruction execution device. The computer-readable storage medium may include, but is not limited to, for example, an electrical storage device, a magnetic storage device, an optical storage device, an electromagnetic storage device, a semiconductor storage device, or any appropriate combination of the above device. A more specific example (a non-exhaustive list) of the computer-readable storage medium includes: a portable computer disk, a hard disk, a random access memory (RANI), a read-only memory (ROM), an erasable programmable read-only memory (EPROM) or a flash memory, a static random access memory (SRAM), a portable compact disk read-only memory (CD-ROM), a digital versatile disk (DVD), a memory stick, a floppy disk, a mechanical coding device such as a punched card or a convex structure in a groove on which instructions are stored, and any appropriate combination of the above.

Various embodiments of the present invention have been described above, and the foregoing description is illustrative rather than exhaustive, and is not limited to the disclosed embodiments. Various modifications and changes are apparent to those having ordinary skill in the art without departing from the scope and spirit of the various illustrated embodiments. The terms as used herein are intended to better explain the principles and practical applications of the various embodiments, or technical improvements of the technologies on the market, or to enable other artisans having ordinary skill in the art to understand the embodiments disclosed herein.

What is claimed is:

1. A vibration-based authentication method for an access control system, comprising the following steps:
   S1, collecting, when a user touches an authentication device of the access control system, a plurality of vibration signals generated by a built-in vibration motor in the authentication device;
   S2, filtering, denoising, and performing endpoint segmentation on the plurality of vibration signals to obtain segmented vibration signals, and extracting vibration signals containing an effective touch from the segmented vibration signals;
   S3, performing an alignment on the segmented vibration signals to obtain aligned vibration signals;
   S4, performing a fast Fourier transform on the aligned vibration signals to obtain frequency-domain data, extracting frequency-domain features obtained after the alignment and features obtained before the alignment to construct a training data set, and storing the training data set in a database of the authentication device;
   S5, using an unlock signal generated when the user touches the authentication device of the access control system as test data, and processing the test data to obtain the test data containing the effective touch; and
   S6, matching and classifying the test data containing the effective touch with the training data set by using a machine learning classification model, to obtain an authentication result.

* * * * *